Patented June 20, 1933

1,914,835

UNITED STATES PATENT OFFICE

JOHN H. PERRY, OF WILMINGTON, DELAWARE, ASSIGNOR TO E. I. DU PONT DE NEMOURS & COMPANY, OF WILMINGTON, DELAWARE, A CORPORATION OF DELAWARE

PROMOTED CATALYST AND METHOD OF MAKING THE SAME

No Drawing.  Application filed June 29, 1929. Serial No. 374,956.

This invention relates to catalytic oxidation processes, and more especially to a process for the oxidation of sulphur dioxide in the manufacture of sulphuric acid wherein an improved catalyst, of the type known as a promoted catalyst, is employed.

It is known that certain substances, which may or may not be catalytic themselves, when added to a given catalyst, have the property of increasing its activity, and in some instances, of maintaining such activity over longer periods of time than would otherwise be the case. These substances are known as promoters, or activators, and catalysts to which they are added are known as promoted or activated catalysts.

It is frequently the practice to support the catalyst upon materials known as carriers. In certain catalytic processes, such as the oxidation of sulphur dioxide in the manufacture of sulphuric acid, the only catalyst carriers for platinum which have been found satisfactory are asbestos and magnesium sulphate. The use of magnesium sulphate has been particularly successful due, not only to its marked effectiveness as a carrier, but also to the fact that the platinum or other catalytic material may be recovered from the catalyst composition merely by dissolving out the magnesium sulphate with water. Some of the disadvantage in its use are that a catalyst used with this material as a carrier is easily poisoned or inactivated by small percentages of salts of alkali or other metals, and that it is particularly susceptible to thermal inactivation. It has been found, for example, that a platinized magnesium sulphate catalyst becomes progressively inactive when heated considerably above the initial temperature of conversion in the oxidation of sulphur dioxide.

Until this invention no convenient method had been proposed for overcoming these difficulties or for preparing a catalyst composition whose initial activity and life at maximum activity is as great as that herein described.

This invention has as an object to carry out catalytic oxidation processes by the use of a promoted catalyst having incorporated therewith a substance, or substances, possessing the power of increasing its initial catalytic activity and life at maximum activity. A specific object is to carry out the oxidation of sulphur dioxide in the contact process for sulphuric acid by the use of a platinum catalyst supported upon magnesium sulphate and having incorported therewith a substance, or substances, which possess the power of increasing the resistance of the catalyst composition to thermal inactivation and to the deteriorating action of certain substances, such as the compounds of the alkali metals. Other objects will appear hereinafter.

These objects are accomplished by the following invention which comprises adding to a catalyst composition a substance or substances which render said composition resistant to chemical and thermal inactivation.

I have found that certain substances, particularly the compounds of the alkali metals, when present in a catalyst carrier such as magnesium sulphate, even in as low concentrations as .03%, have a deleterious effect on catalytic activity in certain reactions, particularly the oxidation of sulphur dioxide. This is shown, for example, by the fact that the initial activity of the catalyst prepared by impregnating alkali-containing magnesium sulphate granules with platinum decreases much faster than is the case with a catalyst composition in which a similar, but alkali-free, platinized magnesium sulphate is used under the same conditions. Furthermore, alkali-containing catalysts are much more susceptible to thermal inactivation than those which are alkali-free.

I have discovered, not only that the deleterious effects of the alkali compounds when present in a magnesium sulphate catalyst composition may be neutralized by the addition thereto of relatively small amounts of certain promoting substances, but also that promoted alkali-free catalyst compositions are more effective catalytically and possess greater initial activity and also longer life at maximum activity when these promoting substances are included in the composition. I have found that the sulphates of the group including trivalent iron, the alkaline earth metals, thorium, tantalum and cerium are especially effective for this purpose. The various compounds referred to as promoting substances are not specific promoters for the catalytic substances themselves. When admixed with the catalyst support or carrier, e. g., magnesium sulfate, they act to promote the efficacy of the support or carrier and hence are termed "support promoters" or "carrier promoters."

As indicated above, the only soluble salt which has been extensively used as a support or carrier for platinum black is magnesium sulphate. I have found that when this material is in the form of hard, porous granules, or in the form of briquettes, the best results are obtained. In making a catalyst according to my invention, a relatively small amount of a sulphate, such as ferric or thorium sulphate, etc., is added to the magnesium sulphate comprising the carrier material.

The preparation of a catalyst according to my invention may be carried out as follows:—

About .05 parts by weight of crystallized ferric sulphate are thoroughly mixed with 5 parts by weight of crystallized magnesium sulphate and the whole melted in its water of crystallization, after which the mixture is heated practically to dryness. The dry material, or "first cake" as it is called, is then ground to a fine powder and mixed with sufficient water to form a thin paste. Two parts by weight of fresh magnesium sulphate crystals are then added and the resulting mixture heated to dryness. The mass thus formed, which is known as the "second cake", is then broken up into granules and screened to the desired size. Instead of using these granules as such, it may be preferred to briquette or pellet the ground granules with or without a suitable binder or lubricant. The granules, or briquetted pellets, which contained approximately 1% of anhydrous ferric sulphate, are then platinized in a well known manner by spraying with a solution of platinic chloride containing a small amount of cane sugar, or other easily reduced substances, to provide for the reduction of the platinum. The granules after this treatment will contain about 0.3% platinum.

The general method of preparing a promoted catalyst, an example of which has been described above, may be used effectively in preparing other catalyst compositions. To be most effective and to come within the scope of the present invention it is only necessary to add the requisite amount of promoting substance, or substances, to the requisite amount of the principal ingredient of the supporting material, for example, magnesium sulphate. What is generally regarded as the true catalytic substance, for example, the platinum in the composition described above, may be incorporated in the composition either before or after granulating or briquetting.

I may use as the carrier either an alkali-free magnesium sulphate or one that is not alkali-free, since the alkali is rendered innocuous by the addition of the promoting sulphates of this invention.

Although I prefer to prepare the second cake as described above, I may omit this part of the procedure and platinize the first cake hydrated magnesium sulphate granules or pellets prepared by heating ferric or other sulphates with magnesium sulphate.

Furthermore, I may add the promoting sulphate to the crystallized magnesium sulphate and melt the two substances together, or I may first melt the hydrated magnesium salt and then add the promoting sulphate to the melt. Furthermore, I have found that various combinations of promoting sulphates may be used. For example, ferric and thorium sulphates may be used in combination, ferric and calcium sulphates, thorium and cerium sulphates, and so on, as illustrated by the following table:

| Parts by weight of crystallized promoting sulphate added to 5 parts by weight MgSO$_4$.7H$_2$O | Percent platinum in catalyst composition | Promoter | Percent of anhydrous promoter in composition |
|---|---|---|---|
| .025 | 0.3 | Ferric sulphate | .5% |
| .05 | " | " | 1.0 |
| .15 | " | " | 3.0 |
| .30 | " | " | 6.0 |
| .035 | 0.3 | Calcium sulphate | 1.0 |
| .21 | " | " | 6.0 |
| .035 | 0.3 | Strontium sulphate | 1.0 |
| .21 | " | " | 6.0 |
| .035 | 0.3 | Barium sulphate | 1.0 |
| .21 | " | " | 6.0 |
| .035 | 0.3 | Thorium sulphate | 1.0 |
| .14 | " | " | 4.0 |
| .035 | 0.3 | Tantalum sulphate | 1.0 |

Although I prefer to impregnate the magnesium sulphate granules or pellets with sufficient platinum to provide .3% in the finished product, I may prepare a catalyst according to my invention having either more or less platinum if desired.

The following examples are given for purposes of illustration and are not to be regarded as limitations:

*Example 1.*—A granulated catalytic mass prepared as described above and containing .3% by weight of platinum, 1.% ferric sulphate, and 98.7% magnesium sulphate was placed in a two-converter Grillo-type contact unit, one fourth of the mass being placed in the first converter and the remaining three fourths in the second. A brimstone burner gas containing about 9.0% sulphur dioxide, 12.0% oxygen and 79.0% nitrogen was passed through the unit and the temperature was slowly raised by the application of external heat until the heat of the reaction due to the conversion of the sulphur dioxide to sulphur trioxide was self-sustaining at about 350° C. The external source of heat was then disconnected and the reaction allowed to proceed. When the gas velocity was maintained at about 350 cubic feet of gas per troy ounce of platinum per hour the conversion of sulphur dioxide to sulphur trioxide was about 97–98%. This high rate of conversion has been maintained for a period of over eleven months of continuous operation under the above conditions with the same catalyst and with no diminution of its catalytic activity.

In contrast to this extremely long maintenance of catalytic activity, an unpromoted catalyst containing .3% platinum and .11% of alkali salt but without the promoting sulphates of this invention was employed under the same conditions of operation described above. The conversion initially obtained was 96.5% which after one day's operation fell off to 93.5%, after one week to 92.0%, after two weeks to 89.4%, finally decreasing to 81.0% at the end of three months.

*Example 2.*—A catalytic mass prepared in the same manner and having the same percentage composition as that of Example 1 was placed in a two-converter unit, one fourth of the mass being placed in the first converter, the remainder in the second. A gas containing 10.0% sulphur dioxide, 11.0% oxygen and 79.0% nitrogen was passed through the catalyst at a temperature of about 350° C. at a space velocity of 850 cubic feet of gas per troy ounce of platinum per hour. The conversion of sulphur dioxide to sulphur trioxide was 95.5–96.5% and this conversion has been maintained over a period of sixteen months with no decrease in the efficiency of the catalyst.

*Example 3.*—The same catalyst was employed under the same operating conditions as in Example 1, except that a gas containing 9.0% sulphur dioxide was passed thereover at a space velocity of 1300 cubic feet of gas per troy ounce of platinum per hour. Conversions of 96–97% at a temperature of 340° C. were obtained.

The rating of a catalyst is usually given in terms of cubic feet of a gas having a given percentage composition per troy ounce of platinum per hour which can be converted so as to give a definite percentage composition of outlet gas. It is apparent that one catalyst is more efficient than another when it can handle a greater volume of gas than another and still produce the same percentage conversions. Heretofore, the rating of similar but unpromoted catalysts has been of the order of about 150 cubic feet of gas per troy ounce of platinum per hour to give maximum conversions of about 96%, whereas the rating of the promoted catalyst of this invention is many times greater.

*Example 4.*—A granulated catalyst containing 0.3% platinum, 1.0% thorium sulphate, 0.28% cerium sulphate, and 98.42% magnesium sulphate gave 1.0% greater conversions than a similar, but unpromoted catalyst when a gas containing 8.0% sulphur dioxide and 92.0% air was passed therethrough at a space velocity of 785 cubic feet of gas per troy ounce of platinum per hour at a temperature of between 375°–410° C.

*Example 5.*—When a similar promoted catalyst containing 1.0% of thorium sulphate was used under the same conditions of operation of Example 4 the increase of conversion over an unpromoted catalyst was 1.8%.

*Example 6.*—A promoted catalyst containing 1.0% thorium sulphate and 1.0% of barium sulphate gave an increased conversion of 1.8% over an unpromoted catalyst under the operating conditions of Example 5.

*Example 7.*—A promoted catalyst prepared as above and containing 1.0% tantalum sulphate gave, under the same operating conditions, an increased conversion of over 1.0% over a similar, but unpromoted catalyst.

Several of the many advantages of the catalyst compositions of my invention over unpromoted catalysts may be enumerated as follows:

1. Greater low temperature activity (higher rating).
2. Greater initial activity.
3. Greater life at maximum activity.
4. Resistance to thermal inactivation.
5. Resistance to the deteriorating and inactivating effect of alkalis.
6. Higher rating at a given conversion temperature.

The promoted catalysts of this invention may be used effectively in a variety of oxidation reactions and find particular application in the oxidation of sulphur dioxide in the contact process for sulphuric acid. Many other applications will be apparent to one skilled in the art.

As many apparently widely different embodiments of this invention may be made without departing from the spirit and scope thereof, it is to be understood that I do not limit myself to the specific embodiments thereof except as defined in the appended claims.

I claim:

1. The process of preparing a magnesium sulphate-supported platinum catalyst which comprises heating a mixture containing ferric sulphate, magnesium sulphate, and water to substantial dryness, forming the resulting material into granules and platinizing said granules.

2. The process of preparing a magnesium sulphate-supported platinum catalyst which comprises heating a composition comprising ferric sulphate and crystallized magnesium sulphate to substantial dryness, granulating the resulting material, forming the granulated material into pellets and platinizing said pellets.

3. The process of claim 2 in which the magnesium sulphate is substantially free from alkali.

4. A granulated catalyst composition comprising 0.3% platinum, 1.0% ferric sulphate and 98.7% magnesium sulphate.

5. The process of oxidizing sulphur dioxide which comprises passing a gas mixture containing sulphur dioxide and oxygen over a catalyst, said catalyst comprising a composition prepared by heating a mixture of ferric sulphate, magnesium sulphate, and water to substantial dryness, forming the resulting material into granules, and platinizing said granules.

6. The process of claim 5 in which the magnesium sulphate is substantially free from alkali.

7. The contact process for the manufacture of sulphuric acid which includes passing a gas mixture containing sulphur dioxide and oxygen over a catalyst, said catalyst comprising a granulated composition comprising 0.3% platinum, 1.0% ferric sulphate, and 98.7% magnesium sulphate.

8. A catalyst composition comprising platinum, a magnesium sulphate carrier for said platinum and a carrier promoter mixed with said carrier, which renders said composition resistant to thermal inactivation and to the deteriorating action of alkalies, said promoter being selected from the group of substances consisting of the salts of the alkaline earth metals, iron, thorium, tantalum and cerium.

9. A catalyst composition comprising platinum, a magnesium sulphate carrier for said platinum and a carrier promoter mixed with said carrier, which renders said composition resistant to thermal inactivation and to the deteriorating action of alkalies, said promoter being selected from the group of substances consisting of the sulphates of the alkaline earth metals, iron, thorium, tantalum and cerium.

10. A catalyst composition comprising platinum, a magnesium sulphate carrier and ferric sulphate mixed with said carrier.

11. The process of preparing a platinum catalyst which comprises mixing a magnesium sulphate carrier with a promoter and platinizing said promoted carrier, said promoter being chosen from the group of substances consisting of the sulphates of the alkaline earth metals, iron, thorium, tantalum and cerium.

12. In a process of oxidizing sulphur dioxide to sulphur trioxide the step of passing a gas mixture containing the sulphur dioxide and oxygen over a promoted catalyst composition comprising a platinum catalyst, a magnesium sulphate carrier for said platinum and a carrier promoter mixed with said magnesium sulphate, said promotor being selected from the group of substances consisting of the sulphates of the alkaline earth metals, iron, tantalum and cerium.

In testimony whereof, I affix my signature.

JOHN H. PERRY.